April 9, 1940.                G. A. GATES                2,196,390
                       ELEVATOR FOR GRAIN OR THE LIKE
                    Filed March 28, 1938      2 Sheets-Sheet 2
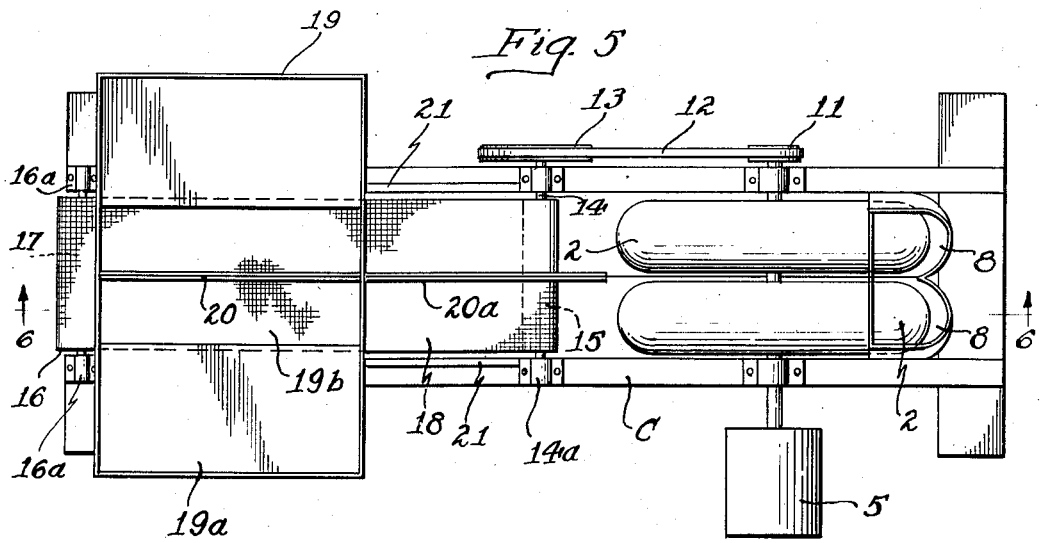
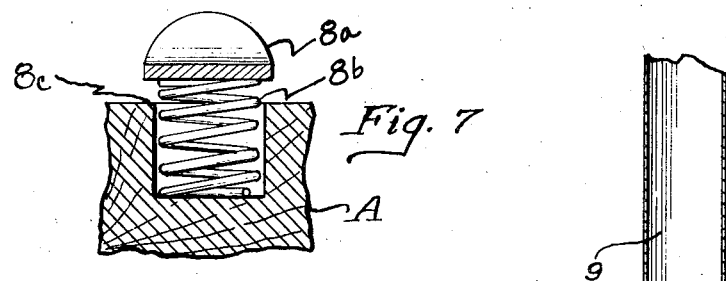
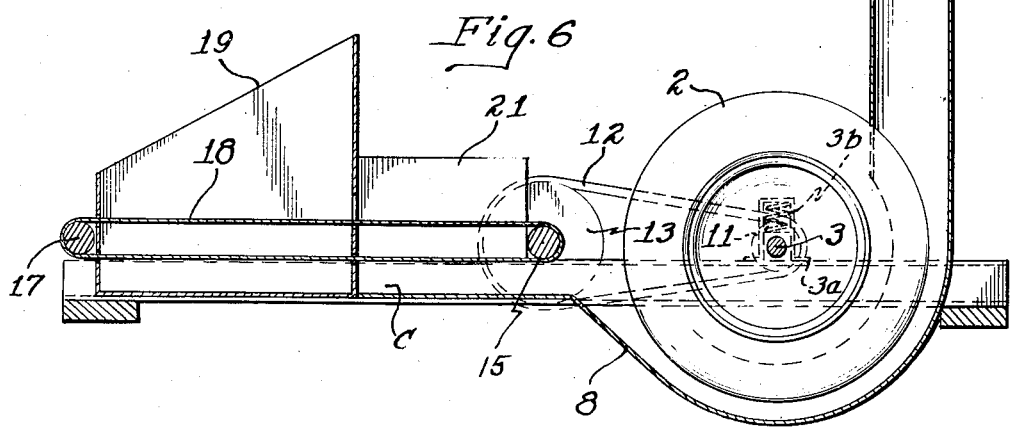
Inventor
George A. Gates
John F. Brezina
His Atty.

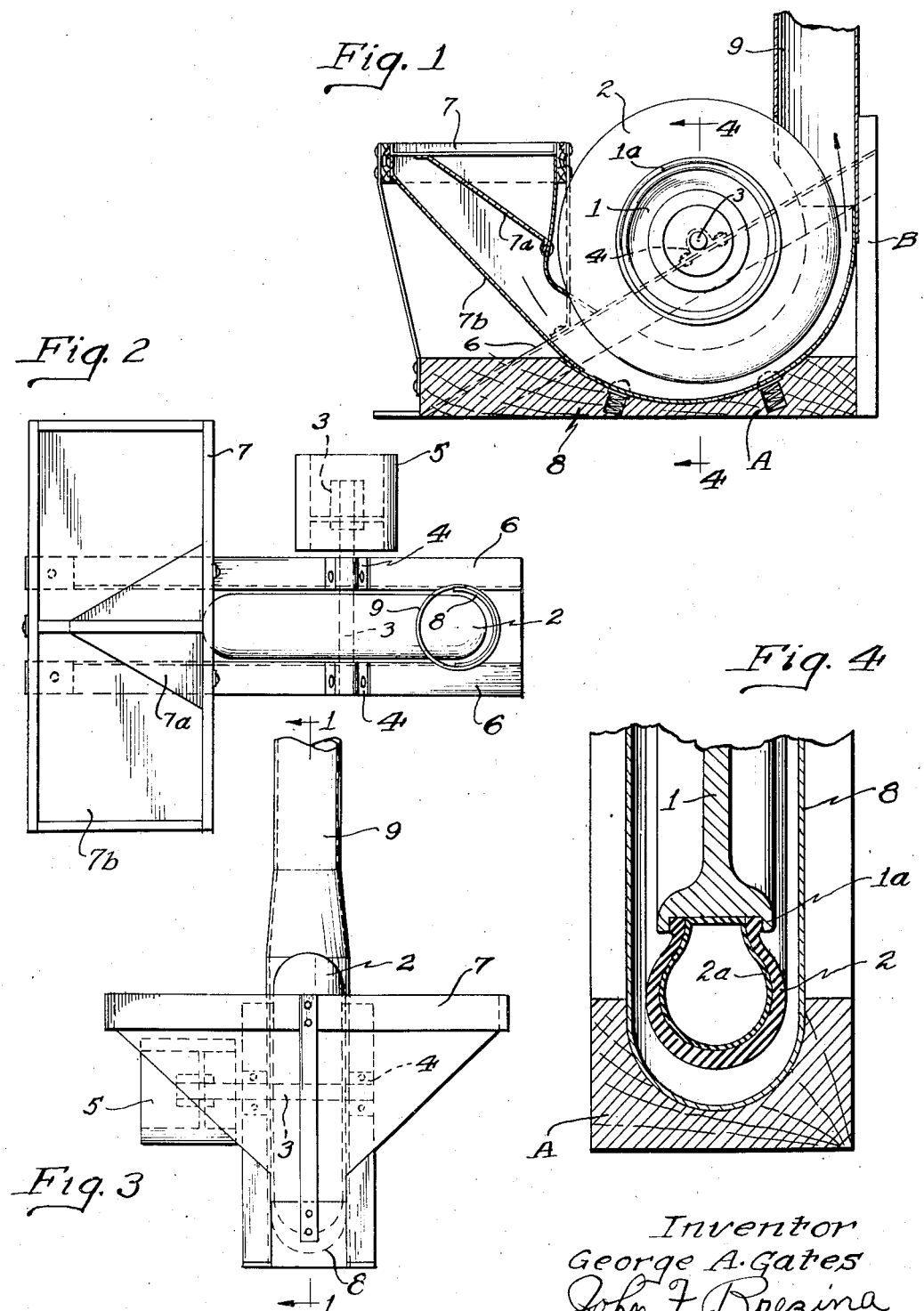

Patented Apr. 9, 1940

2,196,390

UNITED STATES PATENT OFFICE 2,196,390

ELEVATOR FOR GRAIN OR THE LIKE

George A. Gates, Dixon, Ill.

Application March 28, 1938, Serial No. 198,406

7 Claims. (Cl. 198—128)

This invention pertains to the general class of devices known and classed as elevators, and seeks as its principal object to use a resilient rotating propulsion means, wheel or tire as a means of propelling grain or the like through tubes or chutes, whence it may be directed into an appropriate bin or crib by relatively large tubes and chutes in substantially conventional and well known manner.

A further object of this device is to provide an elevator for grain or the like which, in addition to the use of a resilient propulsion means, tire or wheel as a means of propelling material to be elevated, provides novel hopper means preventing the material to be elevated from clogging the device.

A still further object of my invention is to provide a device of the abovedescribed general class in which the material from the hopper may be forcibly conveyed to the resilient propulsion means and whereby a forced feed of the material from the hopper and to the frictional propulsion means may be provided.

A still further and highly important object of the invention is to provide a machine of the abovedescribed class which is of extremely simple construction, easily manufactured and repaired, when necessary, and which, as a result of low cost construction, may be sold at a relatively low price to the ultimate consumer.

While it is known that elevators for grain and the like have heretofore been invented wherein a series of fan-like blades have been provided on a rotating member or on which a series of cups are provided, yet, it is not believed that the advantages inherent in this invention, namely, a resilient yieldable propulsion means in the preferred form of a tire or wheel, have been used, or wherein the novel means herein shown for preventing clogging of material in the hopper have been shown. Nor is it believed that a relatively forced feed of the material from the hopper and to the resilient propulsion means have ever been successfully provided heretofore.

It will be obvious that there is a special advantage inherent in the provision of a yieldable propulsion means or tire in that that portion of the device will handle both large and small volumes of material flowing through the trough without adjustment, and also in that, when flattened out, the surface of the device presents a relatively wide frictional area which has an inherent tendency to "grab" the material passing thereunder.

On the drawings:

Fig. 1 is a cross sectional view taken substantially on the lines 1—1 of Fig. 3, the resilient propulsion means, tire or wheel being shown in side elevation.

Fig. 2 is a plan view of the device otherwise shown in Fig. 1, the circular pipe or tube which conveys the material to its ultimate destination being shown as cut off.

Fig. 3 is a rearward end elevation of the device shown in Figs. 1 and 2.

Fig. 4 is a fragmentary cross sectional view of the preferred form of propulsion means taken substantially along the line 4—4 of Fig. 1.

Fig. 5 is a plan view of a modified form of the general invention otherwise shown on the drawings, in which a plurality of propulsion means or wheels and tires are shown and illustrating also a modified form of means to forcibly feed the material from the hopper to the propulsion means or wheels, consisting preferably of a driven endless belt.

Fig. 6 is a cross sectional view taken substantially along the line 6—6 of Fig. 5. Fig. 7 is a side elevational view of a form of resilient mounting for the trough, shown on the drawings.

As shown on the drawings:

The numeral 1 indicates a wheel or rotary portion which in the form shown carries on its outer periphery a rim 1a on which an inflated tire or casing 2 is mounted in substantially conventional manner. In preferred form, an inner tube 2a, shown in Fig. 4, adapted to contain a quantity of relatively compressed air and susceptible of being inflated in the manner conventional to tires and tubes for automobiles and the like, is placed in the casing 2.

Wheel 1 is rigidly attached to and rotatable with a transversely extending shaft 3 which is journalled substantially as shown in bearing portions 4. Shaft 3 also carries a clutch pulley 5 on one outermost end, said pulley 5 being adapted to be rotated in the direction substantially as indicated by the arrows in Fig. 1, by a belt attached to a source of power.

The journals or bearings 4 are carried, in the preferred form shown in Figs. 1, 2 and 3, by a pair of braces 6, substantially as shown in the drawings, and the braces 6 are themselves rigidly attached to the base A and to an upwardly extending standard B on said base.

As shown in Figs. 1 and 7 the trough 8, in preferred form, rests against the protruding heads 8a of a cushioning portion adapted to permit resilient depression of the trough under pressure. The said head 8a being rigidly fastened to a spring 8b, the spring being recessed in an aperture 8c in the base portion A.

In the preferred form shown in Figs. 1, 2 and 3, a hopper 7 is provided and a substantially angularly mounted triangular flat strip of wood or metal 7a is provided in the hopper, as shown in Figs. 1 and 2 and adapted to provide a means for splitting and spreading material in the hopper so that it is evenly distributed and does not clog the outlet portion or neck 7b of the hopper 7.

A curved trough 8, disposed below the plane of the hopper, connects to the outlet portion or neck of the hopper 7 and is so formed and cut out at the topmost portion thereof as to permit the wheel 1 and attached tire 2 to rotate therein in relatively close but spaced relation to the bottommost portion and sides of the inclined trough 8. As will be seen from the drawings, the trough 8 is U-shaped in cross section and formed in the shape of an irregular curve. As will be seen from the drawings (Fig. 4), the wheel 1, tire 2 and trough 8 are in relatively spaced relation to one another, the sides of trough 8 partially enclosing the tire 2. The said trough 8 terminates, preferably at its topmost portion, in the tubular or cylindrical portion 9 which serves as an outlet or guiding means for the material driven through the trough 8 by the resilient tire 2 when rotated in manner substantially as herein set forth and indicated on the drawings.

In the modified form of the device shown in Figs. 5 and 6 a pair of tires 2 are shown, operating in parallel relation to one another and in a pair of inclined troughs 8 which, as shown at the right of Fig. 5 turn upwardly and bend inwardly toward one another to discharge into a common outlet pipe 9. As will be seen from the drawings, in this modified form of my device, the shaft 3, carrying wheels 1 and appurtenant parts are attached to and journalled in a relatively horizontally extending frame C and the journalling portions 3a and the coil spring 3b mounted thereabove permitting the shaft 3 to move slightly, if necessary, from a horizontal plane within the limits defined by spring 3b. One end of shaft 3, in this form, carries a pulley 11 and drive belt 12 which transmits motion to the pulley 13 in conventional manner substantially as shown, to transmit motion to endless belt 18, hereinafter more fully described. A clutch pulley 5 attached to shaft 3 and connected to a source of power, provides the necessary rotative movement for the parts.

A pulley 13 is carried by a shaft 14 which extends transversely of the frame C and is journalled at both ends in journals 14a. A roller 15 is carried by shaft 14, as shown. The shaft 16 journalled at its ends, as shown, in journals 16a and carrying roller 17 is provided at the rearwardmost end of the frame C. An endless belt 18 carried by rollers 15 and 17 is adapted to run in the general direction of the resilient propulsion means or tires 2 to carry material from the hopper to the said resilient propulsion means or tires.

Hopper 19 is provided with the relatively sloping side panel portions 19a inclined inwardly toward the endless belt and providing a preferably rectangular discharge outlet portion 19b above the endless belt 17. A perpendicularly extending wall 20 is preferably provided in the hopper and an extension of said wall 20, indicated by numeral 20a, extends longitudinally of the belt 17 and approximately to the resilient tires 2. This wall 20 is adapted to prevent material from being largely thrown towards either one or the other of the tires 2, and to distribute the flow of material to the propulsion means or tires 2.

As shown in Fig. 6, a pair of perpendicularly extending side guard strips 21 are provided, these strips running longitudinally of the frame C and adapted to prevent material from falling off the endless belt 17 at the sides thereof.

It will be seen from the above-detailed description that I have provided a novel form of elevator for grain or the like which makes use of a resilient propulsion means or tire for providing propulsive force for the material to be elevated. By using a relatively conventional rear rim and tire assembly and by inflating the casing and tube contained therein to a moderate amount of pressure, say ten or fifteen pounds, the tire will be in a somewhat depressed and relatively flattened position in the trough 8 when material is passing thereunder and the friction thus imparted to the topmost portion of the material to be elevated will in turn be conducted by friction to other portions and particles lying underneath those topmost portions which contact the tire. The motion thus given the grain or the like will force it into the tube 9 whence it may be conducted to any desired place by movable or flexible tubing (not shown), which is conventionally used in material elevators and the like of all kinds.

When using that modified form of the device shown in Figs. 5 and 6, it will be apparent that the movable belt 17 will convey material to the propulsion means or tires and that the said propulsion means or tires will force the material into the tube 9 in manner substantially as set forth above with respect to that preferred form of my device shown in Figs. 1, 2 and 3.

It will be noted that I have shown in Figs. 1, 2 and 3 a form of my invention in which only one resilient propulsion means or tire is used. Also that in Figs. 5 and 6 I have shown the use of a pair of propulsion means. It should be obvious that the relative width of each wheel may be varied as requirements dictate, or that the use of a plurality of such elements in that form shown in Figs. 1, 2 and 3 are within the scope of my disclosure as well as is the use of a singular form of wheel, tire or propulsion means for that modified form of my device particularly shown in Figs. 5 and 6.

While I have described my invention in considerable detail I realize that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a device of the described class, the combination of a container for a supply of material, means for conveying material from said container to a fixed base, a fixed base shaped in an irregular curve and substantially U-shaped in cross section and enclosing only the peripheral portion of a propulsion means, a propulsion means, and an annular peripheral portion on said propulsion means, said annular peripheral portion being spaced from said fixed base and being yieldable in the direction of the axis of said propulsion means under pressure of material propelled thereby.

2. In an article of the described class the combination of a source of material, a rotating propulsion means comprising a relatively unyielding central portion, a tire forming a relatively resilient and yielding peripheral portion on said unyielding central portion, rotating in spaced relation to a fixed underlying trough enclosing only a portion of said propulsion means and in communication with said source of material and in further communication with a discharge means for conveying material forced beyond said rotating propulsion means.

3. In an article of the described class the combination of a source of material in communication with a trough, an irregularly curved trough in spaced relation to a rotating propulsion means, a rotating propulsion means, a tire forming a yieldable peripheral portion on said propulsion means and rotating in spaced relation to said irregularly curved trough, and a tube in end communication with said trough forming a discharge means for material carried by the yieldable peripheral portion of said propulsion means.

4. In an elevator for material, the combination of a gravity fed hopper in communication with a trough substantially U-shaped in cross section, a wheel and a resilient tire carried thereby rotatable in spaced relation to said U-shaped trough and providing a means of providing propulsive force for material fed by said trough, and a tube at the discharge end of said trough providing a means for directing discharged material from said trough.

5. In an elevator for grain and other material, the combination of a gravity fed hopper in communication with an irregularly curved trough, said trough being substantially U-shaped in cross section and substantially enclosing a tire, a wheel, a resilient tire carried by said wheel, said resilient tire rotating in relatively close spaced position to said trough, and a tube at the discharge end of said trough providing a means for directing material discharged from said trough.

6. In an elevator for grain or the like, the combination of a hopper, endless belt means for carrying material from said hopper to a trough, a substantially U-shaped trough in spaced relation to a tire, a wheel adapted to carry a tire and in driven connection with a source of power, a tire on said wheel and rotatable therewith in relatively close spaced relation to said trough and a tube in end communication with said trough forming a discharge outlet means for disposing of the material carried forward by said tire.

7. In an elevator for grain or the like, the combination of a hopper, a movable endless belt adapted to carry material from said hopper, said belt in relatively end communication with an irregularly curved trough, a trough, substantially U-shaped in cross section, a wheel and tire in driven connection with a source of rotative power, said tire being substantially enclosed by a portion of said trough and rotating in spaced relation thereto and a tube in end communication with said trough serving as a discharge means for material carried forward by the rotation of said tire.

GEORGE A. GATES.